United States Patent [19]
Adler et al.

[11] Patent Number: 5,515,937
[45] Date of Patent: May 14, 1996

[54] NON-TRACKBOUND VEHICLE WITH AN ELECTRIC TRANSDUCER

[75] Inventors: Uwe Adler, Schweinfurt; Hans-Jürgen Drexl, Schonungen; Dieter Lutz, Schweinfurt; Franz Nagler, Ottendorf; Martin Ochs; Stefan Schiebold, both of Schweinfurt; Hans-Joachim Schmidt-Brücken, Geldersheim; Wolfgang Thieler, Hassfurt; Michael Wagner, Niederwerrn; Holger Westendorf, Hambach; Rainer Wychnanek, Madenhausen, all of Germany

[73] Assignee: Mannesmann Aktiengesellschaft, Düsseldorf, Germany

[21] Appl. No.: 399,370

[22] Filed: Jan. 13, 1995

[30] Foreign Application Priority Data

Oct. 4, 1991 [DE] Germany .................. 41 33 013.7

[51] Int. Cl.$^6$ ................. B60K 1/04; B60K 6/04
[52] U.S. Cl. .......... 180/65.2; 180/65.4; 180/65.8
[58] Field of Search ................ 180/65.2, 65.4, 180/65.8; 318/139, 141, 142, 143, 153

[56] References Cited

U.S. PATENT DOCUMENTS 4,923,025  5/1990  Follers .................... 180/65.2
5,318,142  6/1994  Bates et al. .............. 180/65.2
5,343,971  9/1994  Heidelberg et al. ....... 180/65.4
5,389,825  2/1995  Ishikawa et al. .......... 180/65.8

FOREIGN PATENT DOCUMENTS 0437266  7/1991  European Pat. Off. .
2419832  11/1979  France ................... 180/65.2
3725620  2/1989  Germany .

Primary Examiner—Brian L. Johnson
Attorney, Agent, or Firm—Cohen, Pontani, Lieberman, Pavane

[57] ABSTRACT

A motor vehicle including a unit (2) consisting of an internal combustion engine, a generator supplying current to electric motors (12, 16) coupled with driving wheels (14, 18) over an energy distributor/power electronics system (8) and a battery which is supplied with energy by the internal combustion engine/generator unit via the energy distributor (2). An electronic control system (20) controls the energy distributor (8) as a function of a driving signal according to boundary conditions, for example, according to the least possible specific fuel consumption. A temporary increase in the power required to drive the motors can be supplied by the battery (22). In the event that the increase in power lasts for longer periods, the internal combustion engine, which as far as possible operates in a state that ensures low fuel consumption, is accelerated in order to cover the demand for high power. At the maximum output of the internal combustion engine, the energy stored in the battery (22) supplies the power for the additional thrust.

11 Claims, 3 Drawing Sheets

FIG. I

NON-TRACKBOUND VEHICLE WITH AN ELECTRIC TRANSDUCER

This is a Continuation Application under 35 U.S.C. §111 and 37 CFR §1.53 of International PCT Application No. PCT/DE92/00832 which was filed on Sep. 30, 1992, published as Publication No. WO 93/07018 on Apr. 15, 1993, and claims priority from German Application No. P 41 33 013.7 filed Oct. 4, 1991.

BACKGROUND OF THE INVENTION

1. Field of the Invention

The invention relates to a non-trackbound vehicle such as passenger cars and trucks for street traffic and, more particularly, to a non-trackbound vehicle including at least one wheel coupled for propulsion with an electronic motor (12, 16) supplied with a controlled current by an electronic energy distributor.

2. Description of the Prior Art

The invention relates primarily to passenger cars and trucks for street traffic. Generally, such vehicles are equipped with internal combustion engines for supplying the necessary driving energy. The number of vehicles powered by battery-supplied electric motors is infinitesimally small.

In the case of either an internal combustion engine, the characteristics of the torque, which are specific for the engine, makes the use of either a manual or automatic transmission necessary depending on the rmp, in order to produce the torque or driving power required for the driving behavior available at the driving wheels.

In the case of vehicles driven by an electric motor, there is basically no need for a transmission in the drive train of the vehicle, since electric motors produce a relatively high torque over a wide range of rpm, so that gear switching is not applicable.

A non-trackbound vehicle of the above-mentioned type has already been proposed. For this prior art vehicle, current is produced by an internal combustion engine/generator (ICEGU) unit, which is then supplied over an energy distributor/power electronics system to the electric motors coupled with the vehicle. For this purpose, the current is supplied to the electric motors as a function of a driving signal, serving as a desired value signal, taking into consideration the operating behavior of the internal combustion engine.

Such a driving mechanism results in several advantages, which either cannot be achieved or can only be achieved at considerable expense by a driving mechanism having a conventional internal combustion engine. For example, slippage of the wheels can be controlled by each driving mechanisms without great expense. In the case of a braking process, the electric motors, coupled with the wheels, can work as generators. Furthermore, the electric energy gained can be used, for example, for heating purposes or the like.

In such a vehicle, with a generator coupled to an internal combustion engine and wheels driven by way of electric motors, is used, for example, in city traffic, the operation of rpm of the internal combustion engine is varied to correspond with the power required. However, frequent changes in the rpm of the internal combustion engine result in an impairment of the efficiency of the internal combustion engine; after all, a frequent change in the rpm is naturally associated with a frequent operation in a region of the family of characteristic curves of the engine in which parameters, such as the minimum fuel consumption for a given power, the least exhaust emission, the least development of noise and the like, have a value, are not optimal.

German Patent application DE 37 25 620 A1 discloses a driving and braking concept for motor vehicles having an internal combustion engine that drives an electric generator. The internal combustion engine is constructed as a pivoting piston engine. The current, produced by the generator, is supplied by an energy distributor, constructed as a power electronics system, in accordance with a control signal generated in dependence on a driving signal, to electric driving motors, which are coupled in each case with one driving wheel or the current is optionally partially stored on an interim basis in a flywheel storage system, which contains an electric machine that can be operated alternately as a motor or generator. When the vehicle is being braked, the electric driving motors can be switched by an electronic control unit, which affects the driving operation, into the generator mode so that at least a portion of the braking energy, after conversion into electrical energy, can be taken up by the flywheel storage system. If required, the control unit can also supply energy from the flywheel storage system via the power electronics system to the driving motors. In this system, the pivoting piston engine is operated at a constant rmp, since the generator, which is rigidly coupled to the pivoting piston engine, generates an alternating current with a constant load frequency at all times. The rpm of the driving wheels is adjusted to the desired value by a control unit using an appropriate corresponding frequency conversion so that there exists a quasi infinitely variable electric transmission between the pivoting piston engine and the driving wheels. A component of the control unit is a "characteristics-programmed" microprocessor which, in the event that the vehicle is braked, generates the required braking force on a conventional wheel braking system and distributes it to the electric driving motors operating in the generator mode. In this connection, the programming of the characteristic refers to characteristics data external to the operation of the internal combustion engine (such as the state of charge of the flywheel storage system, as well as the frequency of the alternating current supplied via the frequency converter and the driving speed and accelerator pedal position). Controlling the internal combustion engine for adapting it to different output requirements based upon characteristic data of the internal combustion engine itself (particularly the rpm/torque characteristics as a function of the position of the throttle valve, advance angle setting, consumption, amount and composition of exhaust, noise emission, unit wear) is not taken into consideration. In this respect, a driving operation, which is optimized with respect to the internal combustion engine, is not ensured for this vehicle for all driving situations.

A non-trackbound vehicle such as passenger cars and trucks for street traffic and, more particularly, to a non-trackbound vehicle including at least one wheel coupled for propulsion with an electronic motor (12, 16) supplied with a controlled current by an electronic energy distributor is known from European Patent Reference No. EP-A-437266.

SUMMARY OF THE INVENTION

It is accordingly an object of the present invention m develop a non-trackbound vehicle of the generic type further in such a manner, so that the operation of the internal combustion engine is optimized by using an energy storage system as an additional energy source in addition to the unit formed by the internal combustion engine and the generator.

The energy storage system is a storage system, which can make energy available relatively rapidly. Basically, it can be a mechanical storage system, for example, a fly wheel. However, a storage battery for storing electrical energy is preferred.

As mentioned previously, current is supplied to the electric motor or motors (preferably at least 2 or 4 or one for each wheel of the vehicle of the non-trackbound vehicle). The motors are coupled with the wheels as a function of a driving signal. This driving signal is generated, for example, by a "gas pedal" (accelerator) on the vehicle, in much the same way as in a conventional motor vehicle.

The inventive control unit is designed so that current is supplied to the electric motors taking into consideration the driver's desires represented by the driving signal either directly on the pan of the internal combustion engine/generator unit, directly on the part of the energy storage system or from both of these two sources of energy. It is important in this connection that the control system takes into consideration the pre-set boundary conditions.

The boundary conditions relate to optimizing one or several of the following parameters:

(a) fuel consumption;

(b) amount and composition of exhaust gas;

(c) noise emission; and (d) stress on the unit

The following explanations relate primarily to the "fuel consumption" parameter, although the invention relates equally to the remaining parameters. In particular, several parameters can be taken into consideration, in which case appropriate families of characteristic curves of the internal combustion engine are superimposed or combined. In so doing, the individual parameters can be weighted equally or differently. If the boundary conditions are specified and, in particular, the mount and consumption of exhaust gas are considered, restrictive environmental conditions with regard to pollutant emission can also be fulfilled to a high degree with the inventive concept.

Of course, fuel consumption is an important parameter for the operation of such a vehicle. For each internal combustion engine, there is a family of characteristic curves, which represents, for example, the course of the torque as a function of the rpm. There is a region, in which the so-called specific fuel consumption is at a minimum. For a particular output of the engine, there is in each case an optimally low fuel consumption for a particular rpm and for a particular torque of the engine. Moreover, there is a point, at which the specific consumption is absolutely the lowest, that is, at which the engine has its most advantageous efficiency. At an rpm lower than this operating point, the fuel consumption admittedly is lower; however, the power drops off excessively. At the rpm above this point, the power admittedly increases, however, relatively slightly in comparison to the increase in fuel consumption. If possible therefore, the internal combustion engine should always be operated in a region close to the point of absolute lowest specific consumption. This objective can be realized within relatively wide limits by the invention. Depending on the desires of the driver (which are represented by the driving signal), the inventive control system makes provisions to use either the internal combustion engine/generator unit by itself, the energy storage system by itself or both energy sources combined for driving the vehicle. The total driving energy required is always made available in electrical form, the current being supplied to the electric motors over an energy distributor power electronics system.

Pursuant to the invention, the boundary conditions are defined by partial regions of a family of characteristic curves for the operation of the internal combustion engine, a condition sensor, which determines the state of charge of the energy storage system, being assigned to the energy storage system. The control unit determines the power requirement of the electric motor or motors based upon the driving signal. The operation of the internal combustion engine is then adjusted to the most advantageous partial region of the family of characteristic curves, depending on the power requirement and the state of charge of the energy storage system.

As indicated above, a first partial region comprises an optimum operating state with respect to at least one parameter, such as a minimum fuel consumption for a given engine power. The operation of the internal combustion engine is then kept within a range covered by the partial region, as long as the power requirement of the electric motor remains in the specified limits. The electric motor is supplied with power by the generator. Optionally, excess energy is stored in the energy storage system. In this operating state, the efficiency of the driving mechanism is at its maximum. However, the engine operates at the lowest specific fuel consumption.

The upper and lower power and torque limits for the first partial region can be varied as a function of the state of charge of the energy storage system.

If the power required increases so that it is greater than the power delivered by the internal combustion engine/generator unit, as long as this unit operates in this region of the most advantageous fuel consumption, various options are possible:

The internal combustion engine continues to operate in the region of most advantageous fuel consumption. The additional power is taken from the energy storage system. If the power is required for only a short time, the internal combustion engine remains in the operating state, in which it has the most advantageous fuel consumption.

If the increase in power is required for a longer time, particularly if a prolonged increase in power can be anticipated, additional energy is initially taken from the energy storage system. After that the rpm of the internal combustion engine is increased until this engine, under some circumstances, puts out its maximum power. The power taken from the energy storage system is reduced to the extent that the power of the internal combustion engine is increased.

If the internal combustion engine is operating in the region of very high power and there is need for additional power, for example, in the case of a "kick-down", the internal combustion engine is brought into the region of highest power and, in addition, energy is withdrawn from the energy storage system, in order to accelerate the vehicle even more. The control system takes into consideration here that the additional power taken from the energy storage system is available only for a limited time. By suitably limiting the withdrawal of power from the energy storage system, it becomes possible that, for example, overtaking can be carried out safely in a certain period of time at very high power, that is, acceleration.

Of course, the customary operating state for battery-operated vehicles, in which all the power supplied to the electric motor is taken from the energy storage system, is also possible intermittently.

If the power required by the vehicle is less than the power supplied by the internal combustion engine in the region of most advantageous fuel consumption, provisions have been made pursuant to the invention that the internal combustion engine is operated intermittently, that is, switched on alternately, in order to operate in the region of most advantageous fuel consumption, and switched off intermittently. This mode of operation is particularly advantageous for city driving, since not only a very advantageous fuel consumption is achieved, but also, at the same time, decreased emission of pollutants can be attained. The respective power required to drive the vehicle is taken from the storage system and a sensor, which monitors the state of charge of the energy storage system, signals when the internal combustion engine must be started in order to charge the energy storage system.

The case addressed above, in which the internal combustion engine is accelerated and, until the maximum power is reached, the additional energy required is covered by the energy-storage system, is realized in conjunction with, for example, a time element. When the need for additional power lasts longer than a specified time, the engine is accelerated after the additional power initially has been taken from the energy storage system. The time of accelerating the internal combustion engine also depends on the state of the storage system. In addition, a learning program can be provided in the storage unit, which stores, for example, the average frequency over a long period of time with which increased power is required. If this frequency is very high, the internal combustion engine can be accelerated already at the end of a very short time, because it can then be anticipated with a high degree of probability that the need for power will last for a longer time. The learning program thus continuously determines the frequency and duration of the increased demand for power and, on the basis of the statistical evaluation of this data, determines the time at which the output of the internal combustion engine is adapted to this demand.

The inventive arrangement also permits braking energy to be utilized by way of the energy distributor. During the braking process, the electric motors operate as generators and, over the energy distributor power electronics system, supply energy back to the energy storage system. Simultaneously or alternatively, the braking energy can also be utilized with a heating resistance for the purpose of heating.

The selection of one of the variations addressed above partly depends very much on the state of charge and also on the capacity of the energy storage system. In order to avoid dangerous situations, particularly when overtaking, it is advisable to monitor and indicate the withdrawal of energy from the storage system, so that the driver is informed in good time that the storage system is largely exhausted.

BRIEF DESCRIPTION OF THE DRAWINGS

In the following, embodiments of the invention are described in greater detail by means of the drawing, in which.

DETAILED DESCRIPTION OF THE PRESENTLY PREFERRED EMBODIMENT

Figure 1:
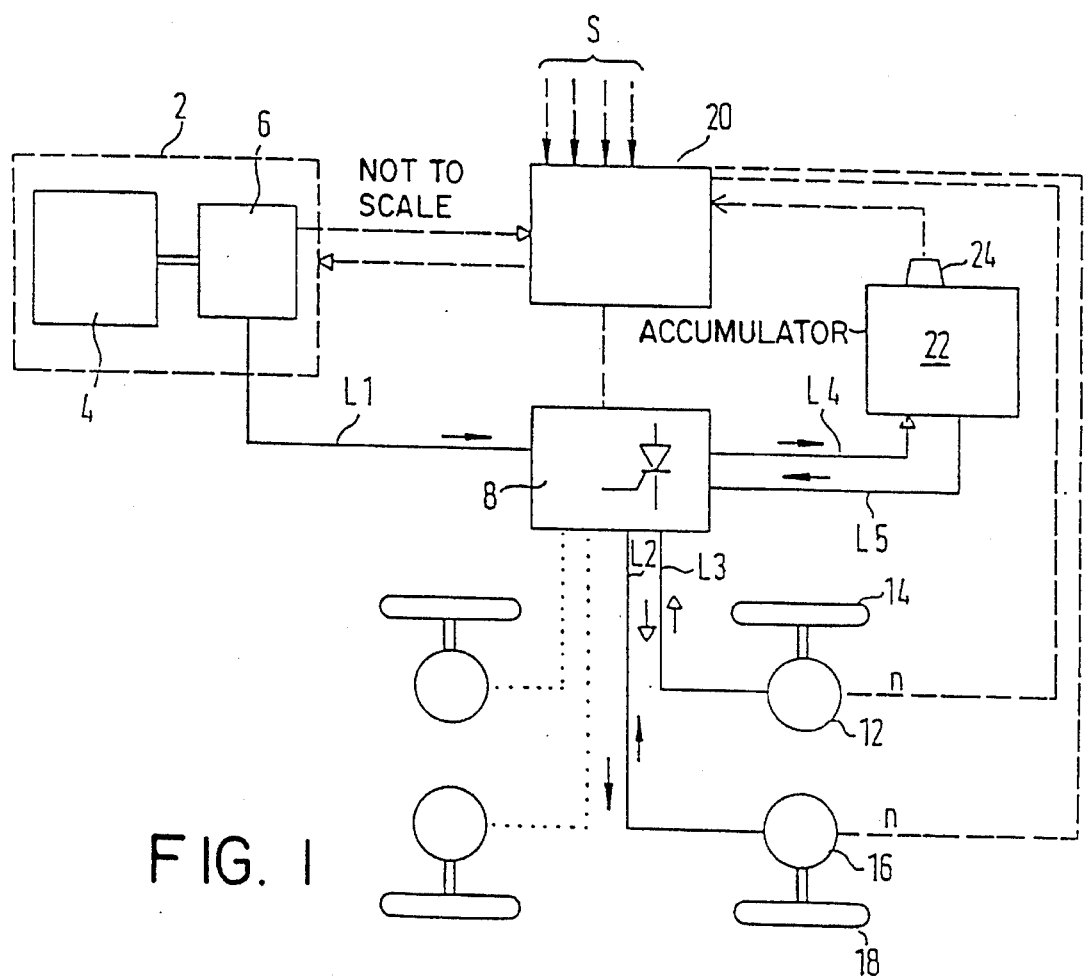
FIG. 1 shows a diagrammatic block wiring diagram of a motor vehicle with an electro-dynamic transducer and an energy storage system in the form of a battery.

FIG. 1 diagrammatically shows the parts of a passenger car, which am essential here. An internal combustion engine, generator unit 2, abbreviated in the following as "ICEGU", contains an internal combustion engine 4 and a generator 6 which is rigidly coupled with the output shaft of the internal combustion engine. The electrical power, generated by the generator 6, is supplied over a cable L1 to a power electronics unit functioning as an energy distributor 8, which supplies electrical current over cables L2 and L3 to two electric motors 12 and 16 respectively, each of which is coupled with a rear wheel 14 and 18 respectively of the vehicle.

At the bottom left of FIG. 1, it is indicated that the two other wheels of the vehicle can also be driven by electric motors.

The supplying of current to the electric motors 12 and 16 by the energy distributor 8 is controlled by a control unit 20, which receives signals from the ICEGU 2 with respect to the rpm and the torque, signals from the electric motors 12 and 16 with respect to the rpm of these two motors and, in addition, sensor signals S from sensors, which am not shown here. Such a sensor signal is, for example, a signal indicating the position of the accelerator, which is characteristic of the angular position of the accelerator ("gas pedal"). A further example of a sensor signal, received by the control unit :10, is a speed signal, which is supplied by a speedometer shaft of the vehicle. Furthermore, a brake signal, an acceleration signal, a signal to indicate whether the engine is hot or cold and a spark advance signal and the like come into consideration as sensor signals.

The control unit 20 contains a microprocessor and a storage unit, which stores control programs and data values of characteristic curves and the like.

When the driver of the vehicle actuates the accelerator, the signal indicating the position of the accelerator is supplied as a sensor signal S to the control unit 20. Taking into consideration the time, the control unit 20 can determine a speed signal for the actuation of the accelerator by forming a difference quotient. Moreover, an acceleration signal can be determined for the accelerator. Using this data, conclusions can be drawn concerning the respective desires of the driver. At a high accelerator speed, for example, a high vehicle acceleration is desired up to a relatively high final speed in the event that the accelerator is depressed completely or almost completely.

Using the control programs, the control unit 20 converts these signals into control signals, which are passed on to the energy distributor 8. In FIG. 1, energy-transferring cables are shown as solid lines while signal-transmitting cables are shown as broken lines. The energy 8 then supplies current via cables L3 and L2 to the two electric motors 12 and 16, respectively as a function of the control signals, so that the vehicle is driven in the manner desired by the driver.

As a special distinguishing feature, the vehicle has an energy storage system, which is designed here as a battery 22 for storing electrical energy. The battery is connected over two electric cables IA and L5 with the energy distributor 8, so that energy is delivered for storage in the battery over cable LA and removed from the battery over cable L5.

The energy distributor 8 is designed in a manner basically known to those skilled in the an so that the energy, which is supplied to the electric motors 12 and 16, is supplied to the energy distributor 8 alternatively over cable L1, that is, from the ICEGU 2 and/or over cable L5, that is, from the energy storage system 22.

A sensor 24 sends a signal to the control unit 20 concerning the respective state of charge of the energy storage system 22.

Figure 2:
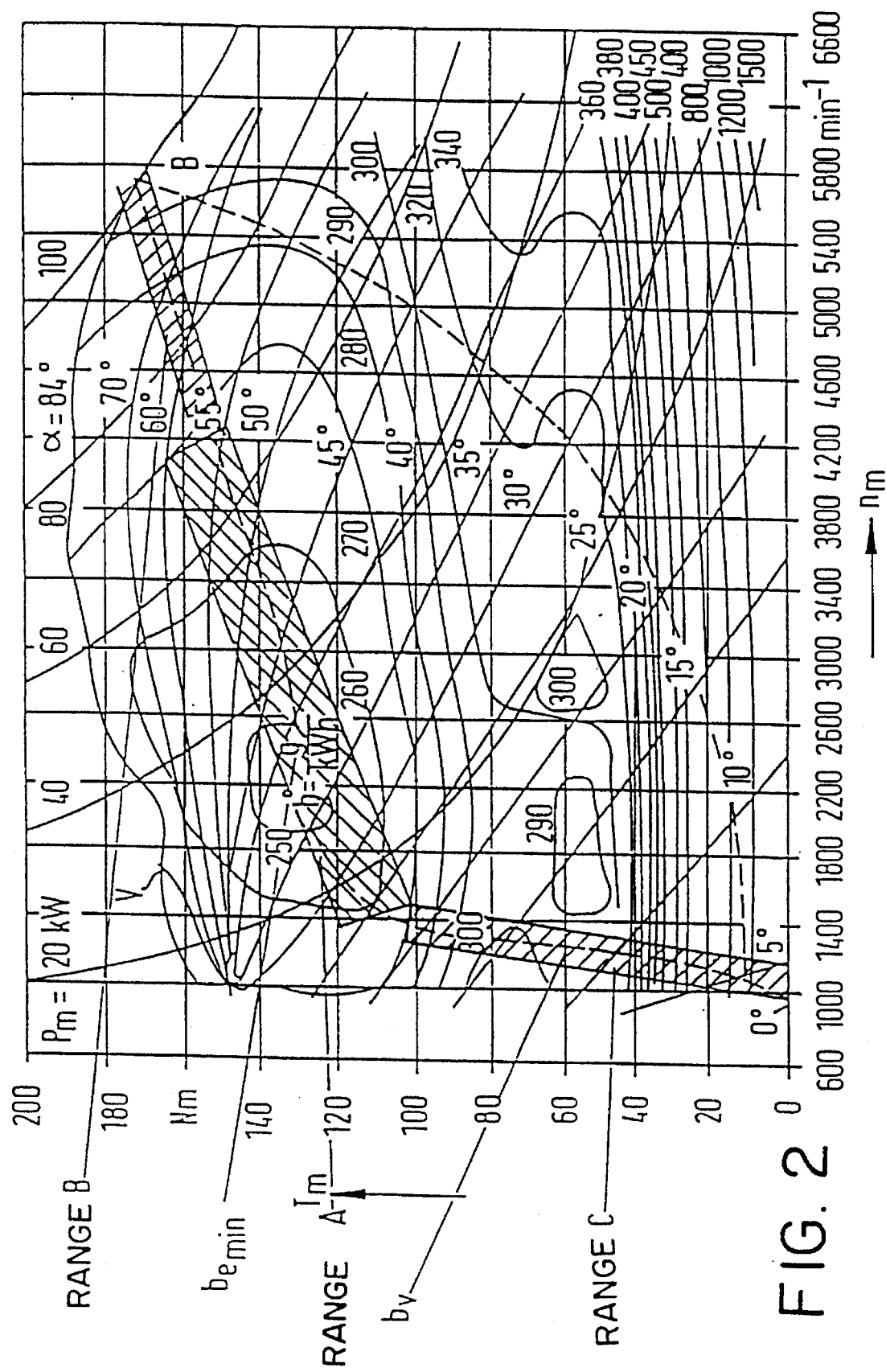
FIG. 2 shows a family of characteristic curves of a 100 kW internal combustion engine.

FIG. 2 shows a typical family of characteristic curves of a 100 kW gasoline engine. The torque is plotted on the ordinate and the rpm on the abscissa. A broken line by $b_v$ characterizes the most advantageous gasoline consumption for particular rpm's and for different power requirements. This line $b_v$ is divided into three regions, which are cross-hatched in FIG. 2, namely into a middle region A, an upper region B and a lower region C.

The middle region A lies in a region enclosed by a "contour line", in which the consumption of the engine has a certain specific value. This region (shell) is that in which the engine should operate, if possible, in order to achieve a high efficiency overall, that is, a low specific consumption.

The upper region B is characterized by higher rpm's and a higher torque (and therefore higher power, since power is the product of rpm and torque). The lower region C is characterized by a very low rpm at a low torque or low power.

Within the storage unit, the characteristic parameters of the internal combustion engine are stored, for example, in tabular form. The regions A, B and C, shown in FIG. 2, form boundary conditions for the operation of the entire driving unit of the vehicle. The present embodiment aims for the least possible fuel consumption, that is, the least possible energy requirement overall. However, the particular desires of the driver are taken into account as far as possible. This means that, if the driver desires a very high rate of acceleration of the vehicle, this desire is fulfilled; however, in supplying current to the electric motors 12 and 16, the boundary conditions named am taken into consideration alternately by the ICEGU 2 and/or the energy storage system 22.

With reference to FIG. 2, the least possible expenditure of energy means that the motor is operated, as far as possible, in region A and, moreover, at point $b_{cmin}$, that is, at the point of the absolutely lowest specific consumption. In FIG. 2, region A extends in the direction of the ordinate over a certain range of torques. This indicates that, within certain limits, it is also possible to depart from line $b_v$ indicating the most advantageous consumption for different power requirements. The prerequisite for this is that the efficiency of the ICEGU is still greater than the storage efficiency. If additional power were to be taken from the storage system for each increase in the power required, in order to operate the engine as close as possible to point $b_{cmin}$, unavoidable energy losses due to the re-storing would possibly be higher than the difference between the optimum efficiency and the lower efficiency defined by leaving the line $b_v$.

In region A, the power required by the electric motors 12 and 16 is basically supplied entirely by the ICEGU, as long as the efficiency is higher than the storage efficiency. The storage efficiency is the ratio of the energy $E_{out}$ provided by the storage system to the electric motors to the energy $E_{in}$ that must be raised for the storage.

$$\eta \text{ battery} = \frac{E_{out}}{E_{in}}, \quad (1)$$

The energy $E_{in}$, which must be raised for storing an amount of energy, comprises the energy charged, the energy that must be raised for the storing process and the energy that must be raised for discharging the storage system.

The efficiency of the ICEGU is the product of the efficiency of the internal combustion engine and the efficiency of the generator.

$$\eta \text{ ICEGU} = \eta \text{ internal combustion engine} \times \eta \text{ generator} \quad (2)$$

The power required is thus supplied entirely by the ICEGU under the following condition:

$$\eta \text{ ICEGU} > \eta \text{ storage} \quad (3)$$

How far the boundaries of region A are drawn depends on the state of charge of the energy storage system 22. If the storage system is fully charged, the boundaries can be relatively wide. For example, boundary values for region A are stored in the control unit and can be multiplied by a factor, which depends on the state of charge of the energy storage system 22. The control unit 20 is informed of this state of charge by way of the sensor 24.

When the driving mechanism operates in region A and the electric motors 12, 16 require somewhat less energy than is put out by the internal combustion engine in the most advantageous operating state, the excess electricity is stored by way of the energy distributor 8 in the energy storage system 22.

Figure 3A:
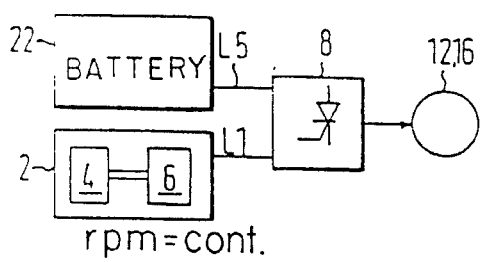
FIGS. 3a–3e show a diagrammatic representation of possible operating states of the driving mechanism of the vehicle.
Figure 4A:
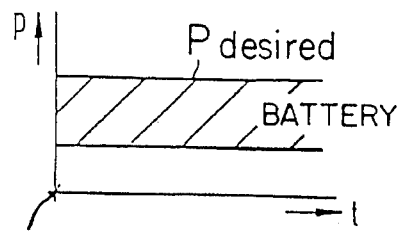
FIGS. 4a–4e show graphical representations of power versus time for the operating states of FIGS. 3a–3e respectively.

If now the power required by the electric motors 12, 16 increases, for example, owing to the fact that the vehicle is on a slope or that the driver would like to accelerate the vehicle, the possibility shown in FIG. 3a arises that the ICEGU, at an essentially constant rpm, operates in the vicinity of the point $b_{cmin}$, at which the consumption is most advantageous, while the additional power required is covered by the energy storage system 22. In FIG. 3a, this is indicated owing to the fact that the ICEGU 2, as well as the energy storage system (battery) 22 are actively connected over cables L1 and L5 with the energy distributor 8. The power required as a function of time is shown in FIG. 4a. The upper region is crosshatched and characterizes the energy per unit time, supplied by the energy storage system 22. This energy supplements the energy supplied by the ICEGU 2, so that the desired value $P_{desired}$ is reached.

The state shown in FIG. 3a is meaningful if the electric motors 12, 16 require more power for short periods.

Figure 3B:
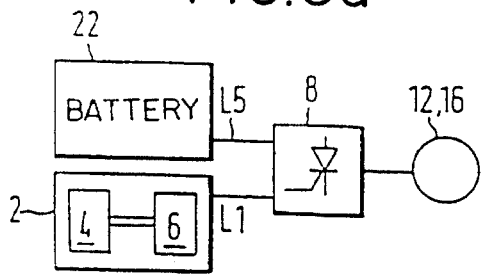

FIG. 3b shows an operational behavior, which initially corresponds to the state of FIG. 3a, that is, initially, the energy supplied by the ICEGU 2 running in the optimum operating state is supplemented up to a value of $P_{desired}$ by the energy from the energy storage system 22. Commencing at time tx, however, the rpm of the internal combustion engine is increased. The portion additionally provided by the energy storage system 22 is decreased to the extent that energy is supplied directly by the ICEGU 2 to the electric motors 12, 16. This is illustrated graphically in FIG. 4b.

The time tx can be fixed, for example, by a time element. When there is an increased demand for power, a time element is started within the control unit 20. If the power requirements still exist when the time period fixed by the time element has expired, the ICEGU 2 is accelerated. This measure is appropriate because the energy taken from the energy storage system 22 is depleted and the excessive discharge of the energy storage system 22 must be prevented.

The time that elapses until the ICEGU 2 is accelerated can be varied depending on the state of charge of the energy storage system 22. The acceleration of the ICEGU 2 can also be made dependent on the frequency with which relatively long-lasting demands for additional power arise. For this purpose, the control unit 20 can count the situations, which correspond to the operating behavior shown in FIG. 4b. If relatively longer demands for increased power arise repeatedly within a time span of, for example, 10 minutes or 30 minutes, the time tx in FIG. 4b can be shifted further to the left, so that the control system "knows", that a longer demand for more power is pending with a high degree of probability.

Figure 3C:
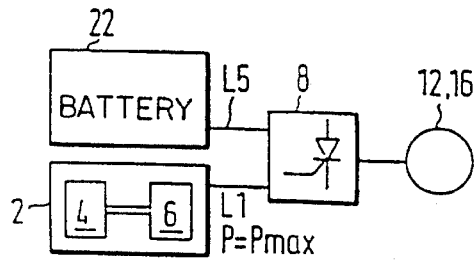

FIG. 3c shows the state in which the ICEGU 2 puts out the maximum power, the accelerator pedal being depressed almost completely. If now there is, for example, a "kickdown" at time t1, the energy storage system is tapped additionally, so that energy is supplied also over cable L5 at time t1 as is shown in FIG. 4c. When the ICEGU 2 unit is putting out practically the maximum power, an additional thrust can be attained by this measure. Such an additional thrust can be meaningful, for example, while overtaking, particularly while overtaking on an incline.

However, it must be taken into consideration that the state shown in FIG. 4c is possible only for a limited time after time t1, since the energy storage system 22 discharges continuously. It is possible to alert the driver to the length of time during which the state of particularly high acceleration can still be maintained through a warning display. The driver can then act accordingly.

The situations, shown in FIGS. 3a, 3b and 3c, correspond to an operation of the vehicle in region B, that is, in a state of increased demand for power. According to FIG. 4a, it is not worthwhile to accelerate the operation of the ICEGU 2 as a brief additional demand for power can be covered by the energy storage system 22.

Figure 4B:
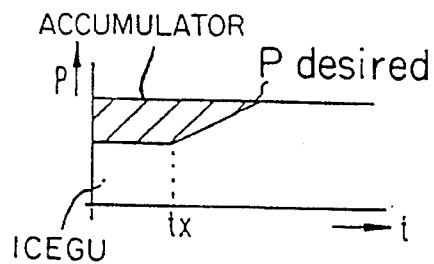
Figure 4C:
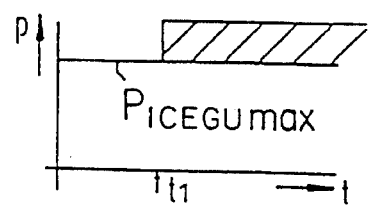

According to FIG. 4b, the storage system would be discharged too quickly in the event of longer-lasting storage system operation.

According to FIG. 4c, an additional "injection of power" takes place, for example, in order to achieve a higher acceleration.

Figure 3D:
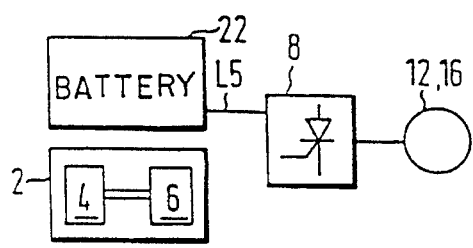
Figure 4D:
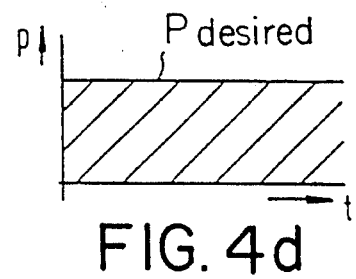

According to FIG. 3d and the graphical representations of FIG. 4d, only the energy storage system 2 is connected over cable L5 with the energy distributor 8. This state can correspond to region B as well as to region C. If the power demanded is very high, the entire amount of power can be taken from the battery. Under practical conditions, however, this sate is hardly of any interest. On the other hand, the operation in region C, that is, in a region in which the internal combustion engine is running in an optimum operating state and supplied significantly more energy to the generator than is required by the electric motors 12 and 16, is interesting. In this case, the ICEGU 2 is switched off completely and the vehicle is driven exclusively by power supplied by the energy storage system 22. This mode of driving is advantageous particularly in heavy city traffic, traffic james and the like. When the energy storage system 22 has discharged to a certain extent, the engine can be switched on once again.

Figure 3E:
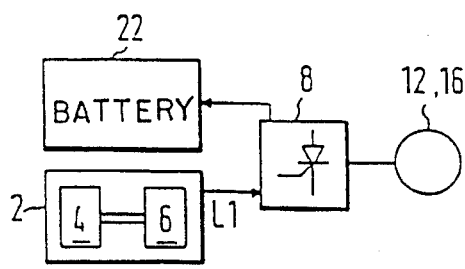
Figure 4E:
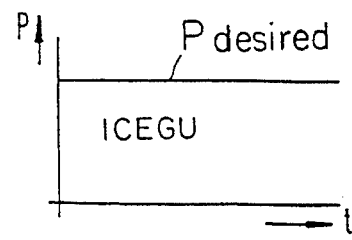

The situation shown in FIGS. 3e and 4e corresponds to region A of the family of characteristic curves. The entire supply of power is provided directly by the ICEGU 2. Any excess energy is supplied by the ICEGU 2 via the energy distributor 8 to the energy storage system 22.

The embodiment described above relates particularly to the "fuel consumption" parameter. The supply of current to the electric motors 12 and 16 from the ICEGU and/or the energy storage system 22 is controlled in order to minimize energy consumption. Alternatively or additionally, other operating parameters can also govern the control system. In particular, the amount and composition of exhaust gas may be mentioned here, since the emission of pollutants, on the average, can be kept to a very low value relatively easily by such a control system.

Furthermore, noise emission and/or stress on the unit can also form the basis of the operating parameter. Stress on the unit is particularly high when a sports car-type of driving is preferred. Because of the frequently high rpm and the frequent change in load, the mechanically moved parts am particularly stressed. The control system can be designed to avoid excessively frequent and high changes in load. The different operating parameters, each weighted in a particular manner, can also be input to the control system.

The realization of the different control possibilities requires no additional effort. In particular, no additional space is required for voluminous additional parts needed for the driving mechanism, nor is them an increase in weight. In city traffic, as well as in so-called "stop-and-go" traffic, the present invention provides an environmentally-safe mode of driving can be achieved. Nevertheless, on the open road, a driving behavior can be achieved, which is superior to that of conventional vehicles with internal combustion is achieved.

We claim:

1. A non-trackbound electrically driven vehicle comprising:

a power unit including:
      an internal combustion engine for generating a power, and
      a generator coupled to said internal combustion engine;
   at least one wheel;
   at least one electronic motor connected to drive said at least one wheel;
   a control unit for sensing operating parameters of said vehicle, determining a power requirement of said at least one electronic motor for driving said at least one wheel based upon said sensed parameters and generating a control signal based upon said determined power requirement;
   an electronic energy distributor connected to receive said power from said generator and said control signal from said control unit and supply said at least one electronic motor with power based upon said control signal;
   an energy storage coupled to receive energy from said generator via said electronic energy distributor for storage and transmit power to said electronic energy distributor including a condition sensor for sensing an amount of power stored in said storage system and generating a charge signal indicative of said sensed amount for transmission to said control unit, said control unit including means for controlling a supply of power to said electrical energy distributor by both said energy storage system and said power unit according to said sensed operating parameters, and means for increasing both an operating speed and power output of said power unit above a predefined operating speed and power output upon determining additional power is required to drive said at least one wheel for a predetermined period of time.

2. The vehicle of claim 1, wherein said control unit further includes means for sensing at least one of fuel consumption, amount and composition of exhaust gas, noise emission and stress on said power unit; and means for comparing said sensed parameters with stored optimal values for said sensed parameters for use in generating said control signal.

3. The vehicle of claim 1, wherein said control unit further includes first means for adjusting said predetermined period of time based upon said charge signal.

4. The vehicle of claim 1, wherein said control unit further includes means for determining a frequency and duration of power requirements for driving said at least one wheel exceeding said predefined power output; and means for measuring an adjustment time for increasing a speed of said internal combustion engine to provide an excess power required.

5. The vehicle of claim 1, wherein said energy storage system is a battery.

6. The vehicle of claim 1, wherein said control unit further includes means for storing boundary conditions and priority values for each of said sensed operating parameters for use in generating said control signal.

7. The vehicle of claim 2, wherein each of said stored optimal values includes first, second and third ranges, said first range including an optimal operating state value, said control unit connected to control said power unit to maintain a first operating speed upon sensing operating parameters within said first range and said energy storage system to store any power produced by said power unit and not supplied to said at least one motor.

8. The vehicle of claim 7, wherein said control unit further includes means for varying said first operating speed based upon said charge signal.

9. The vehicle of claim 7, wherein said second range of optimal values corresponds to a greater power requirement for said at least one electric motor than a power supplied by said power unit operating at said first operating speed, during operation within said second range of values said control unit is connected to control a supply of power to said at least one motor wherein said vehicle operates in one of;

a first mode in which said power unit is operating at said first operating speed and connected to supply all power generated to said at least one motor and said energy storage system is connected to supply any additional power required by said at least one motor;

a second mode in which said speed of said power unit is increased to a second operating speed and connected to supply all power generated to said at least one motor and said energy storage system is connected to supply any additional power to said at least one motor during a period in which said operating speed is increased to said second operating value;

a third mode, in which said at least one motor requires a maximum amount of power, said operating speed of said power unit is increased to a third maximum operating speed to produce a maximum amount of power and is connected to supply all power generated to said at least one motor and said energy storage system is connected to supply any power difference between the power required by said at least one motor and the power supplied by said power unit operating at said third maximum operating speed; and a fourth mode in which said energy supply system is connected to supply all power required by said at least one motor, said mode of operation being based upon both a time period for which additional power is required and the amount of power required by said at least one electric motor.

10. The vehicle of claim 9, wherein said control unit controls the vehicle to operate in a fifth mode in which said energy storage system is connected to store any power difference between said power supplied by said generator and said power required; and a sixth mode in which said power unit is connected for intermittent operation when the power supplied exceeds said power required by said at least one motor.

11. The vehicle of claim 10, wherein said control unit further includes means for determining and comparing an efficiency of said power unit and an efficiency of said energy storage system and controlling said system to operate in a seventh mode in which said generator is connected to supply power to said at least one motor when said efficiency of said power unit is greater than said efficiency of said energy storage system.

* * * * *